United States Patent [19]

Harry

[11] 4,446,022

[45] * May 1, 1984

[54] VIBRATORY SCREENING APPARATUS FOR SCREENING LIQUIDS

[75] Inventor: Alan Harry, Royston, England

[73] Assignee: Thule United Limited a British Company, Aberdeen, Scotland

[*] Notice: The portion of the term of this patent subsequent to Dec. 22, 1998 has been disclaimed.

[21] Appl. No.: 353,109

[22] Filed: Mar. 1, 1982

Related U.S. Application Data

[63] Continuation of Ser. No. 171,283, Jul. 23, 1980, abandoned.

[30] Foreign Application Priority Data

Aug. 9, 1979 [GB] United Kingdom ................. 7927830

[51] Int. Cl.³ .............................................. B01D 23/24
[52] U.S. Cl. .................................... 210/388; 209/269; 209/315
[58] Field of Search ............................. 210/388, 384; 209/315–317, 269

[56] References Cited

U.S. PATENT DOCUMENTS

| | | | |
|---|---|---|---|
| 2,246,483 | 6/1941 | Dillon | 210/388 |
| 2,312,969 | 3/1943 | Jönsson | 209/269 |
| 3,425,553 | 2/1969 | Slovic | 209/315 |
| 4,224,146 | 9/1980 | Kent et al. | 210/388 |
| 4,306,974 | 12/1981 | Harry | 210/388 |

FOREIGN PATENT DOCUMENTS

| | | | |
|---|---|---|---|
| 1088920 | 3/1955 | France | 210/388 |
| 1425021 | 12/1965 | France | 210/384 |
| 509591 | 7/1939 | United Kingdom . | |
| 642844 | 9/1950 | United Kingdom . | |
| 1037102 | 7/1966 | United Kingdom . | |

*Primary Examiner*—Benoît Castel
*Attorney, Agent, or Firm*—Oblon, Fisher, Spivak, McClelland & Maier

[57] ABSTRACT

A vibratory screening machine as described separating solid particles from liquid in which a fine mesh screen (30) includes an inclined region extending upwardly to a discharge edge (34) over which solid material (36) separated by filtration can pass. Vibration of the screen (30) causes the solid particulate material to move towards the discharge edge (34).

The screen (30) forms the base of a reservoir having sides (10) and a weir or dam (46) at the opposite end to the discharge edge (34) and is slidable in and out to provide for cleaning and/or replacement.

A suspension of liquid and solid particulate material is supplied to the machine along a pipeline (28) and is discharged onto the rear end of the screen (30) from a discharge head (24).

One or more intermediate screens of similar design may be located above the main vibrating screen and above one another and the suspension of liquid and solid material discharged onto each of the screens overflows onto the rear end of the screen immediately therebelow. Trays (68) and (70) are provided to catch liquid draining through.

8 Claims, 5 Drawing Figures

VIBRATORY SCREENING APPARATUS FOR SCREENING LIQUIDS

This is a continuation of application Ser. No. 171,283, filed July 23, 1980, now abandoned.

DESCRIPTION

Field of Invention

This invention concerns vibratory screening apparatus particularly for the screening of liquid muds obtained from oil well drilling operations and the like.

BACKGROUND TO THE INVENTION

A suspension/solution of certain clays and other additives is used as a mud for drilling. The functions of the mud are to act as a lubricant, a sealant to maintain hole pressure, a coolant for the drill, and a hydraulic carrier of cuttings from the bottom of the hole to the surface. Because of the additives, the mud is normally reclaimed and after reconditioning is re-circulated.

Reclamation has been achieved by removing the drilling cuttings by settlement but current practice is to remove the large cuttings through a coarse mesh (on a shale shaker). The resulting mud containing fine cuttings has then been pumped through hydrocyclones which separate most of the mud from the sand and silt. The removal of the last of the mud from the sand and slit (approximately 5%) has been achieved by passing it through a fine mesh screen. Thus the hydrocyclones handle 100% of the mud (excluding large solids) but only approximately 5% goes to the fine screen.

Hydrocycloning has been found to break up the particles which are to be filtered due to the high shear that occurs in a hydrocyclone. The result is that the particles which are to be filtered may well be broken down to particle sizes equal to that of the mud particles and the result is that there is a minimum size below which particles cannot be removed from the mud. These minute particles equivalent to the size of the mud particles tend to accumulate in the mud until eventually the mud becomes totally unusable since the contaminating particles cannot be separated from the mud particles by filtration.

Clearly therefore, it would be an advantage not to employ hydrocycloning since simple filtration does not break up the contaminating particles into the mud sized particles and 100% filtration can be achieved.

Clearly if hydrocycloning is to be avoided, the whole of the liquid flow must pass through the fine screen. In order to handle the total flow a fine screen would have to be a very large area and further problems arise due to the fact that the fine screen tends to be fragile. These problems are discussed in British Patent Specification 1,326,133, reference to which is made for a description of a conventional vibratory screening machine consisting of a vibrating basket inside of which is mounted a woven mesh screen. This Patent Specification described the use of hookstrips for tensioning fine mesh screen. Alternatively this screen may be tensioned during manufacture and glued to a frame ready for quick assembly into the vibrating basket.

The motion of the basket may be linear, elliptical or circular and the mud/solids are fed onto one end of the screen (typically the rear end). The vibration of the screen causes the solids which settle onto the screen to be thrown up and along towards the opposite end of the screen (i.e. the front).

The vibration of the screen serves two purposes:
1. It prevents the solids from accumulating on the screen and blocking the mesh.
2. It conveys the solids to the front of the screen where they can be collected and typically fall off to facilitate disposal.

Typically therefore, the basket is open at the front end to permit the overflow of solids from the screen.

The maximum capacity of a conventional screen constructed along these lines is usually regarded as being when ⅔ of the screen is covered with mud. The remaining ⅓ "dries" the solids. The capacity of such a screen can be increased by increasing the frequency and/or the amplitude of the vibration since this effectively increases the acceleration of the particles and forces more liquid through the mesh. Maximum amplitude and frequencies are limited by basket design and construction.

Conventional screens are mounted either horizontally or sloped downwards towards the front where the particles leave the screen, since this improves the conveying of the particles.

It is, therefore, an object of the present invention to provide an improved vibratory screening machine for the fine screening of liquids particularly for the fine screening of oil well drilling muds.

THE INVENTION

According to the present invention in a vibratory screening machine for separating particles from liquid in which a fine mesh screen is located within a vibratory basket and means is provided for vibrating the basket, the fine mesh screen is inclined over at least part of its area so that it extends in an upward direction towards the edge over which filtered particles are discharged due to vibration.

A screen embodying the invention may, therefore, comprise a flat fine mesh screen which is angled so that the discharge end is higher than the opposite end of the screen and a weir or dam is arranged at the lowr end so as to retain a depth of liquid over the screen.

Alternatively the screen may be in the form of a shallow 'V' with one of the limbs of the 'V' substantially horizontal and extending between the inclined section of the screen and a weir or dam at the rear end of the screen.

The inclined screen possesses a rough surface which is essential to provide for the upward conveying of the filtered particles.

The preferred arrangement comprises a flat sloping screen since such screens are easier to make, transport and store.

The invention relies for its success on the fact that the flow rate through a mesh is related to the pressure difference across the screen and this pressure difference depends on the depth of the liquid above the screen (as well as the acceleration of the basket). The invention relies on increasing the flow rate by increasing the depth of mud on the screen.

In a preferred embodiment of the invention the mesh is a flat sloping screen which extends at a shallow anlge from a solid weir wall at the rear end to the discharge edge at the opposite end, means is provided for discharging mud (liquid and solid) onto the rear end of the screen adjacent to the weir wall and vibration of the screen in the appropriate direction causes solid material which has not passed through the mesh, to be conveyed towards the discharge edge over which it is discharged.

The depth of the mud on the screen is dictated to a certain extent by the strength of the screen and since a fine screen is required, the strength is not very great. Consequently for a maximum depth of mud, the throughput of the screen is determined by its area.

Once again the question of strength arises and according to a preferred feature of the invention an increased throughput can be obtained by providing at least one intermediate screen between the point of discharge of solid and liquid material and the first mentioned screen, the intermediate screen having a weir wall height less than the height of the discharge edge and being located above the first mentioned screen such that excess liquid and solid material will flow over the weir wall at the rear of the intermediate screen onto the first mentioned screen near the rear end thereof, the discharge edge of the intermediate screen being arranged to overhang the discharge edge of the first mentioned screen so that solid material discharged from the intermediate screen will drop clear of the discharge edge of the first mentioned screen and means is provided for collecting liquid material filtered through the intermediate screen and for conveying this liquid material to the output of the apparatus along with liquid material filtered from through and collected from the first mentioned screen.

It will be appreciated that a number of intermediate screens may be stacked one above the other between the discharge point which must always be higher than the uppermost intermediate screen and the first mentioned screen which forms the lowest screen in the apparatus. Each such intermediate screen serves to feed the screen below by overflow over the weir wall at the rear of the screen and each must overhang the lower screen at the discharge end by a sufficient amount to allow the discharged solids to drop clear of the lower screens. Furthermore, in each case each intermediate screen must include a tray or similar collection device for collecting and discharging liquid filtered through the screen.

Where one or more intermediate screens are employed, means is provided for vibrating not only the first mentioned screen but also the intermediate screen or screens.

To facilitate cleaning and maintenance, preferably each of the screens is mounted so that it can be slid out of the stack to allow for inspection, cleaning and/or replacement.

The invention will now be described by way of example with reference to the accompanying drawings.

IN THE DRAWINGS

FIG. 1 is a side elevation of a vibratory screening apparatus embodying the invention, FIG. 2, is a skeleton cross section through the machine shown in FIG. 1, FIG. 3 is a skeleton cross section on the line b—b of FIG. 4, of an embodiment of the invention which incorporates a stack of screens, FIG. 4 is a skeleton section on the line a—a of FIG. 3, FIG. 5, is a perspective view of part of the apparatus shown in FIG. 1, showing the sliding of the trays.

DETAILED DESCRIPTION OF DRAWINGS

Figure 1:
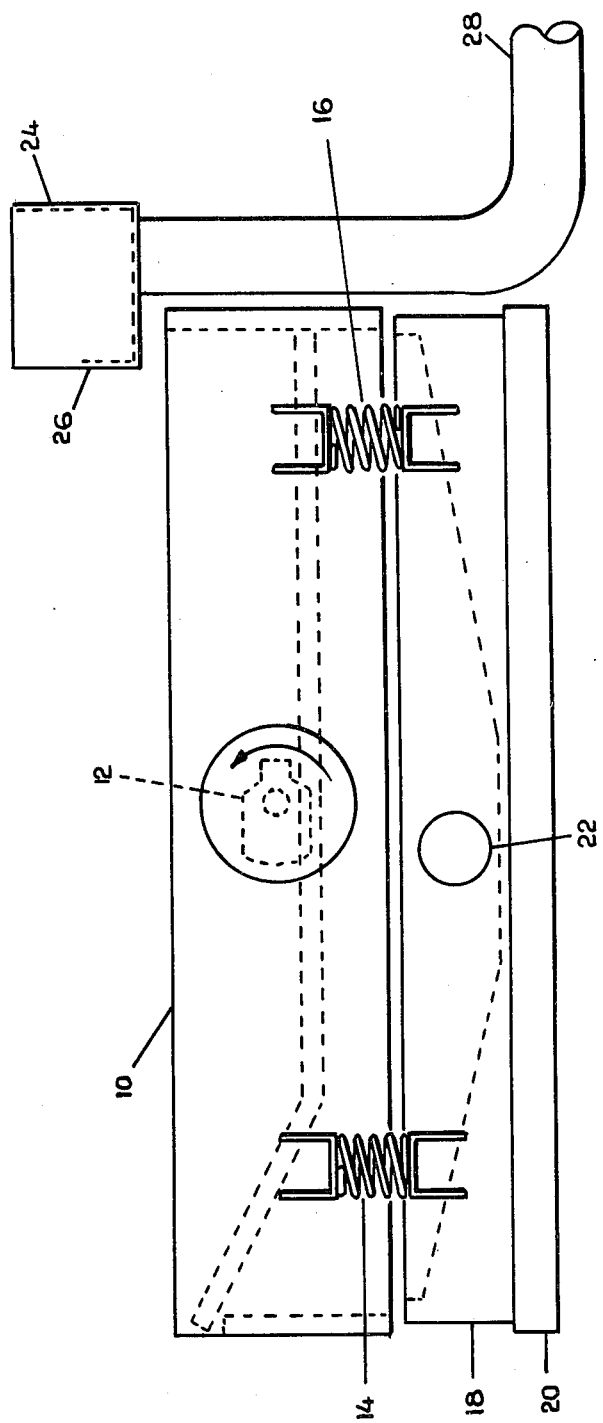
Figure 2:
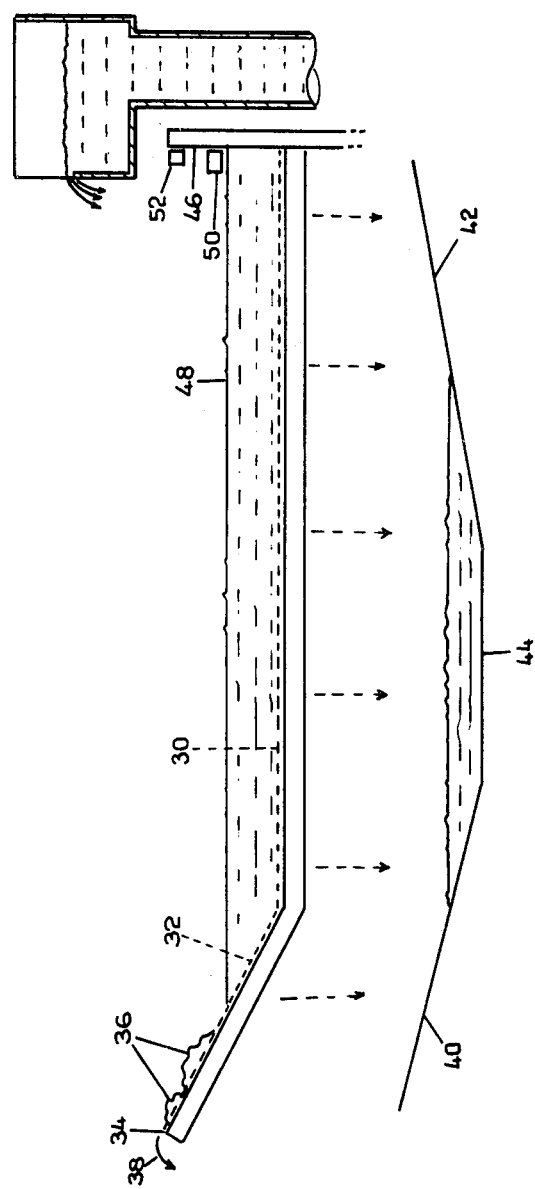

FIGS. 1 and 2 illustrate a basic embodiment of the invention. This comprises a basket 10 which is vibrated by a rotating mass 12. spring mountings 14 and 16 allow the basket 10 to vibrate relative to a fixed frame (not shown) and relative to a stationary fluid reservoir 18 below the basket 10. The reservoir 18 is mounted on a base 20 and includes a fluid outlet 22 at the lowest point. Although not shown, valve means may be provided for controlling the rate of flow from the outlet 22. Although described as a reservoir, tank 18 is essentially a discharge tank for funnelling the filtered mud away.

A header tank 24, which includes a weir 26 over which liquid can flow when it exceeds a given depth in the tank 24, is supplied with a liquid and solids mixture along an inlet pipe 28 and it is this mixture which overflows the weir 26 and spills into the basket 10.

The design of the interior of the basket is best understood from studying FIG. 2.

The floor of the basket is formed from a fine mesh screen 30 the greater area of which is flat and horizontal and which includes an inclined section 32 which leads up to a discharge edge 34 over which solid materials such as 36 obtained by the filtration process will be ejected in the direction of the arrow 38 on the vibration of the screen 30.

The liquid which drains through the fine mesh screen 30 is collected in the reservoir 18 the floor of which slopes at 40 and 42 towards a central low level 44.

The right hand end of the basket 10 as shown in FIG. 1 and 2 (which constitutes the rear of the basket) is a solid wall 46 and this constitutes a weir or dam so that a depth of liquid can accumulates on the screen 30 as denoted by 48. In the embodiment shown, the throughflow of liquid and solid material into the header tank 24 must be controlled so that the depth of liquid 48 within the basket 10 is less than the height of the weir or dam 46.

To this end a level sensing switch 50 may be provided to sense when the level 48 reaches a given level within the basket so at that stage to either shut down the flow of liquid and solids through the inlet pipe 28 or to adjust the apparatus so as to increase the through-flow of liquid through the screen as by increasing the amplitude and/or frequency of the vibration of the basket.

Where the switch is employed to simply increase the amplitude or frequency of vibration, a further overflow switch such as 52 would be required to shut off the flow of incoming material in the event that the liquid level 48 reached the level of the switch 52.

The apparatus shown in FIGS. 1 and 2 is obviously limited in throughflow volume by the factors previously mentioned and in addition to the area of the screen 30.

Figure 3:
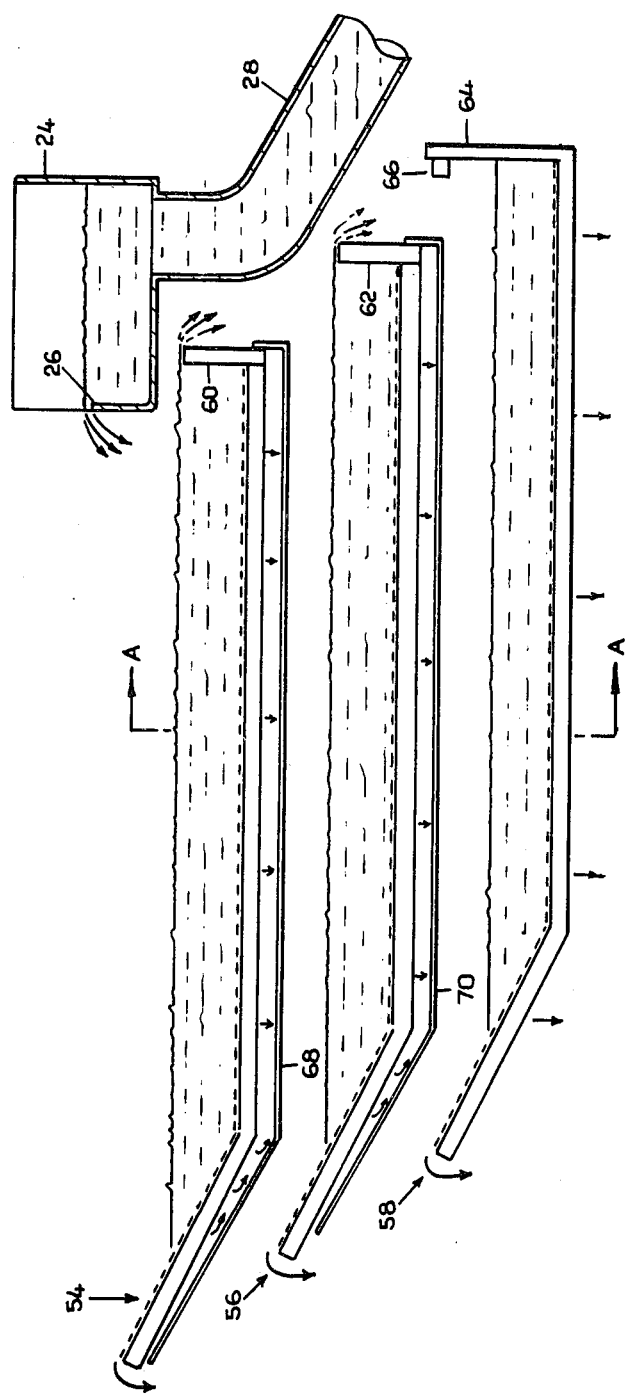
Figure 4:
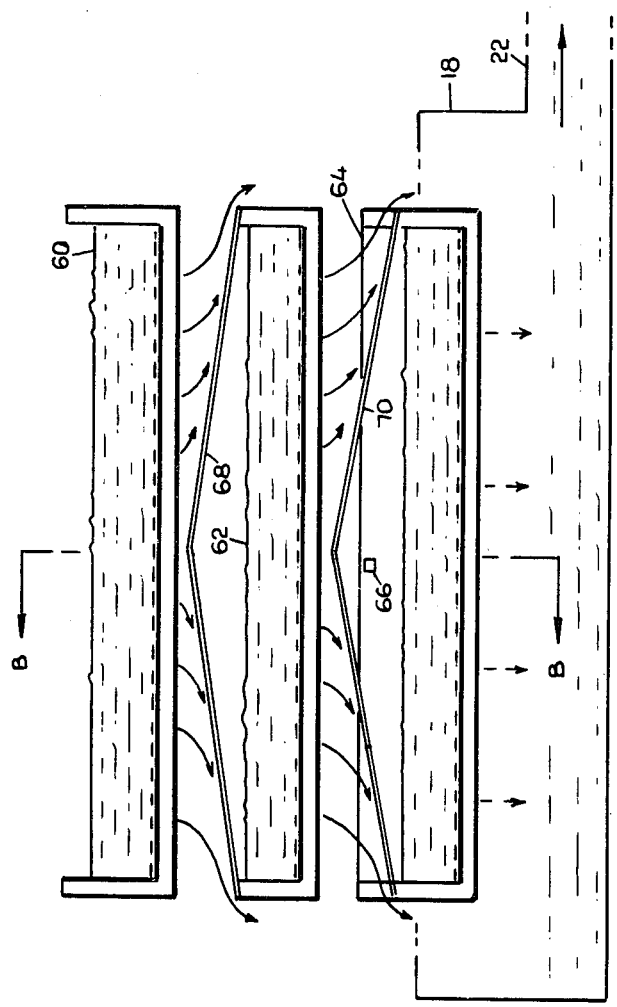

In order to handle an even higher throughput volume, arrangements as shown in FIG. 3 and 4 may be employed.

The FIG. 3 embodiment incorporates a stack of three vibrating filtration trays generally designated 54, 56 and 58. The trays are mounted one above the other and each includes a weir 60, 62 and 64 respectively. The weir 64 is considerably higher than the weirs 60 and 62 and includes an overflow switch 66 to operate in the same manner as overflow switch 52 in the event of a blockage or excess flow. The height of each of the weirs 60, 62 and 64 may be adjustable.

The header tank 24 and feed pipe 28 operate to discharge solid and liquid material over the weir 26 in exactly the same way as described with reference to FIGS. 1 and 2.

Each of the trays and screens 54, 56 and 58 is vibrated and separate controls and vibration drives may be provided for each of the trays or a single drive unit and appropriate coupling may be provided, as required.

The discharge over the weir 26 will first fill the tray 54 to the depth of the weir 60 after which liquid and solid material will overflow the weir 60 and discharge onto the tray 56. This will then become filled and overflow over the weir 62 onto the third and lower-most tray 58. The throughflow will normally be designed so as not to exceed the height of the weir 64 so that the overflow switch 66 only operates in an emergency situation.

Each of the trays operates in the manner described with reference to the basic embodiment shown in FIGS. 1 and 2 and solid material is conveyed to the left and discharged over the left hand edges of the trays.

A liquid collection tray 68 and 70 is provided respectively under each of the filtration trays 54 and 56 and the liquids which drain through the various meshes in the trays 54 and 56 drain down the collection trays and into the main collecting reservoir 18 which operates in the same way as described with reference to FIG. 1 and FIG. 2.

FIG. 4 shows how the collection trays consitute roofs for the trays 56 and 58 so as to prevent the filtered liquid from falling onto the trays below and serve to deflect the liquids to one side and the other as shown by the arrow so as to drain down past the lower filtration trays into the main collection reservoir 18.

Figure 5:
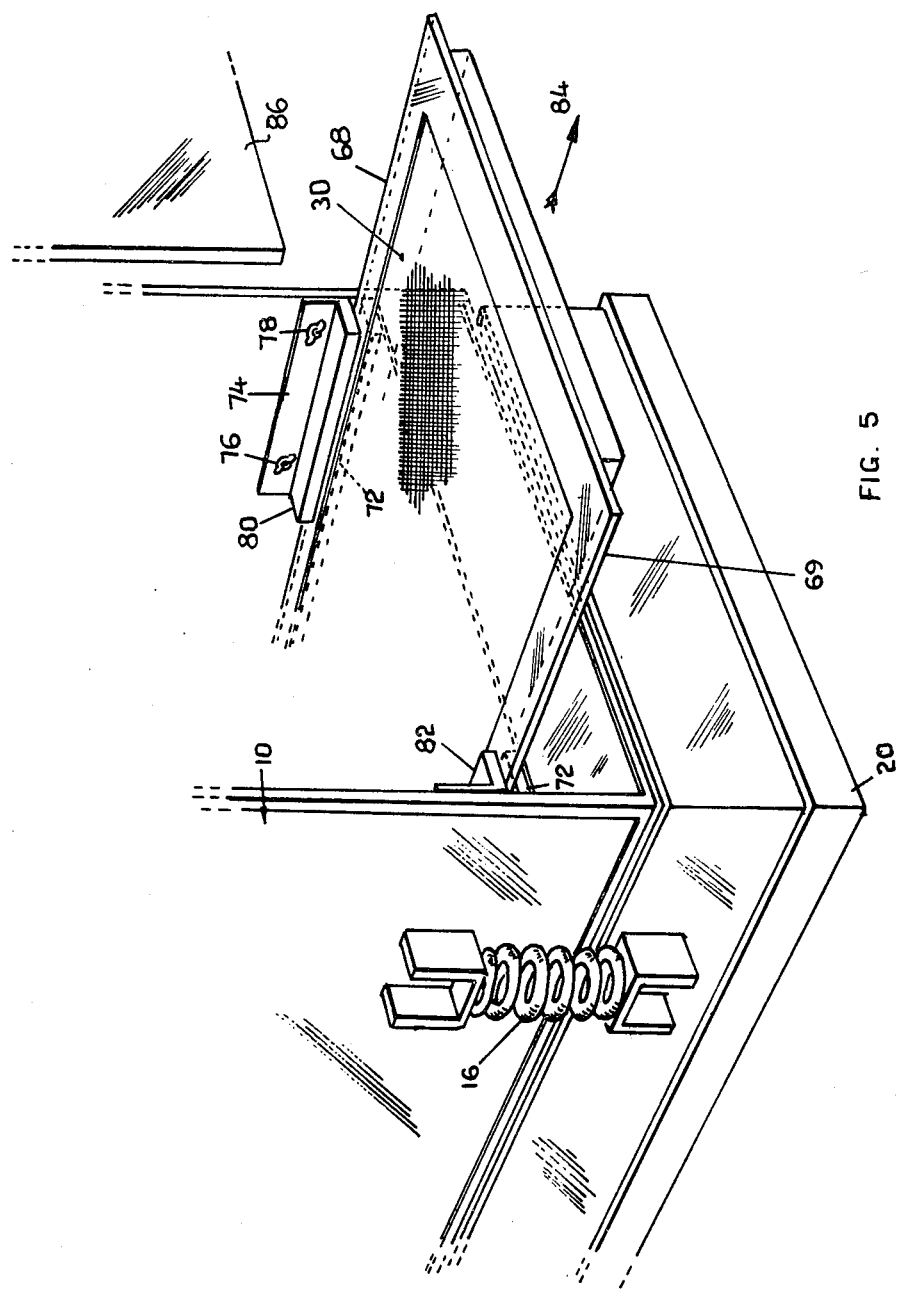

FIG. 5 illustrates how the screen 30 may be slid in and out of the basket 10. The screen is supported within a frame having side flanges (68,69) which rest on horizontal bearers 70, 72 within the basket 10. Removable brackets such as 74 are fitted within the basket above the bearers and held in place by wing nuts 76, 78 or the like. Each bracket includes a lateral flange 80, 82 which overlies the flanges 68, 69.

The frame can be slid in and out in the direction of the arrow 84. Although not shown bolts or the like hold the frame in place.

An end closure plate 86 is removable from the basket to allow complete removal of the frame and screen— which can be achieved by completely removing the brackets such as 74.

I claim:

1. A vibratory screening machine for separating solid particles from liquid, comprising means for introducing a liquid medium having said particles, a fine mesh first screen located within a vibratory basket, means for vibrating the basket, a frame surrounding the screen, the fine mesh screen being in the form of a shallow 'V' with one of the limbs of the 'V' being so inclined that it extends in an upward direction towards a discharge end having a first edge over which filtered particles are discharged due to vibration, the other limb of the 'V' being substantially horizontal and extending between the inclined limb and a weir or dam at the rear of the screen, horizontal bearers within the basket for supporting the frame at the sides of the substantially horizontal portion of the screen, and clamping means for securing the screen within the basket, the clamping means being removable to permit the entire screen and frame to be slidably removed from the basket.

2. A vibratory screening machine as set forth in claim 1 in which the weir or dam at the rear end of the screen comprises a removable end closure plate.

3. A vibratory screening machine as set forth in claim 1 in which at least the inclined limb of the screen possesses a rough surface to facilitate in the upward conveying of the filtered particles.

4. A vibratory screening machine as set forth in claim 1 in which said means for introducing comprises means having a point of discharge for discharging said liquid medium onto an end of the screen opposite to said first edge and wherein the direction and amplitude of the vibration of the screen is selected so that a portion of said particles which does not pass through the mesh is conveyed towards a discharge end of the screen having said first edge over which said particles are discharged.

5. A vibratory screening machine as set forth in claim 1 in which at least one intermediate screen is located between a point of discharge of material to be filtered and said first screen, said intermediate screen having a weir wall height less than the height of said discharge end and being located above said first screen so that excess material to be filtered will flow over the weir wall at the rear of said intermediate screen onto said first screen near the rear end thereof, the discharge end of said intermediate screen being arranged to overhang the discharge end of said first screen so that solid material discharged from said intermediate screen will drop clear of the discharge end of said first screen.

6. A vibratory screening machine as set forth in claim 5 in which means is provided for collecting liquid medium filtered through the intermediate screen and for conveying this liquid medium to the output of the apparatus along with liquid medium which filters through and is collected from said first screen.

7. A vibratory screening machine as set forth in claim 5 in which means is provided for vibrating the intermediate screen.

8. A vibratory screening machine as set forth in claim 5 in which each intermediate screen is mounted so that it also can be slid in and out of the machine to allow for cleaning and/or replacement.

* * * * *